(No Model.)

M. L. DE WITT.
CRANK AXLE FOR FORWARD WHEELS OF WAGONS.

No. 485,492.  Patented Nov. 1, 1892.

Witnesses:
Laura Stanchfield
John F. Hoyt

Inventor:
Melville L. DeWitt

UNITED STATES PATENT OFFICE.

MELVILLE L. DE WITT, OF EASTON, MAINE.

CRANK-AXLE FOR FORWARD WHEELS OF WAGONS.

SPECIFICATION forming part of Letters Patent No. 485,492, dated November 1, 1892.

Application filed July 27, 1892. Serial No. 441,383. (No model.)

*To all whom it may concern:*

Be it known that I, MELVILLE L. DE WITT, of Easton, in the county of Aroostook and State of Maine, have invented certain new and useful Improvements in Crank-Axles for Forward Wheels; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
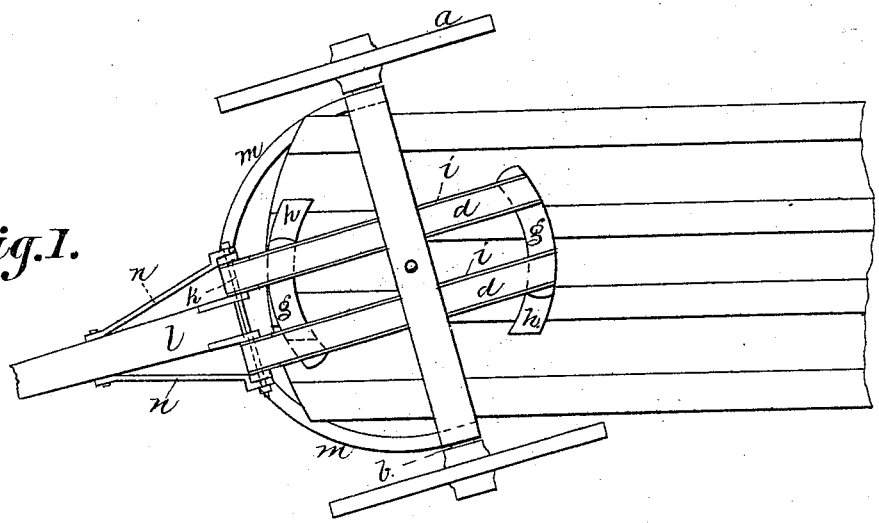
Figure 2:
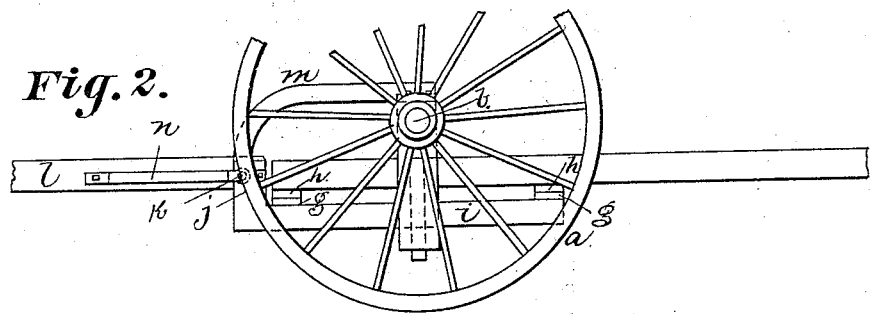
Figure 3:
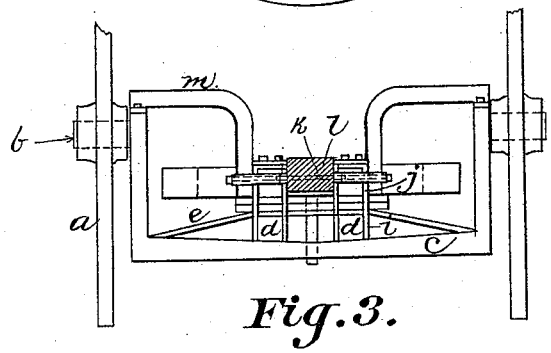

Figure 1 is a bottom plan of the forward part of a vehicle having my improved crank-axle. Fig. 2 is a side elevation of the same. Fig. 3 is a front end view of the same.

The same letters refer to like parts.

This invention relates to improvements in crank-axles, and more particularly to crank-axles for forward wheels.

It consists in an axle having a downwardly-extending set-off, a bearing attached thereto for the body, whereby the body may be extended forwardly of the axle to some distance, means for securing the pole and braces for holding it firmly, and in certain details of construction, which will be hereinafter more fully described.

In said drawings, $a$ represents the forward wheels; $b$, the axle, having a set-off $c$ therein. Firmly bolted to the bottom of said set-off are bars $d$, extending crosswise of the axle. Passing over bars $d$ and attached at each end to the bed of the axle is a plate $e$, said plate $e$ being also bolted to said bars $d$. The bars $d$ extend some distance in front of and behind said axle and have on the tops thereof circle-plates $g$, which form bearings for corresponding circle-plates $h$, attached to the bottom of the body. Firmly bolted to the sides of bars $d$ are metal plates $i$, having their forward ends $j$ turned up at a point somewhat beyond the end of the body when in position, as seen in Fig. 2. Passing through said ends $j$ is a rod $k$, to which between said bars $d$ is hinged or pivoted the end of the pole $l$. Curved braces $m$ extend from the upright part of each axle to the ends of said rod $k$, which hold said bars $d$ firmly, but do not interfere with the swiveling of the body. The pole itself is strengthened by braces $n$, extending from said rod $k$ to a point on the pole some distance beyond the point of attachment of the pole to plates $i$.

The advantages of the present construction are that the body of the wagon may be brought nearer to the ground, and thus the load more easily placed thereon, and that the body of the wagon may be extended forward of the front wheels, thus causing the load to bear more heavily on the fore wheels, causing it to draw more easily.

Having thus described my invention and its use, what I claim, and desire to secure by Letters Patent of the United States, is—

1. In a crank-axle for forward wheels, an axle proper having a set-off therein, bars attached to said axle and at right angles thereto, metal plates attached to the sides of said bars and having their forward ends turned up, and a pole pivotally attached to the forward ends of said bars, substantially as and for the purposes set forth.

2. In a crank-axle for forward wheels, an axle proper having a set-off therein, parallel bars rigidly secured to said set-off portion of the axle and at right angles thereto and having on top thereof circle-irons for supporting the vehicle-body, metal plates attached to the sides of said bars and having their forward ends turned up, a rod set in said forward ends, and a pole pivotally attached to said rod between said bars, substantially as and for the purposes set forth.

3. In a crank-axle for forward wheels, an axle proper having a set-off therein, parallel bars rigidly secured to said set-off portion of the axle and at right angles thereto and having on top thereof circle-irons for supporting the body, metal plates attached to the sides of said bars and having their front ends turned upward, a rod set in said turned-up portions, a pole pivotally attached to said rod, a metal plate passing over said bars, firmly attached thereto, and securely fastened at each end to the axle-bed, forming a rocker-plate, and curved braces extending from the upright parts of said axle to and firmly attached to said turned-up ends of said side metal plates by means of said rods, substantially as and for the purposes set forth.

In testimony that I claim the foregoing as my own I affix my signature in presence of two witnesses.

MELVILLE L. DE WITT.

Witnesses:
 DURA STANCHFIELD,
 JOHN F. HOYT.